(12) United States Patent
Glissmann et al.

(10) Patent No.: US 8,697,209 B2
(45) Date of Patent: Apr. 15, 2014

(54) PLASTIC BODY AND A PRODUCTION SYSTEM FOR MAKING A PLASTIC BODY

(75) Inventors: Markus Glissmann, Notzingen (DE); Christoph von Hiller, Stuttgart (DE); Patrick Friessem, Brühl (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 13/432,495

(22) Filed: Mar. 28, 2012

(65) Prior Publication Data

US 2012/0276313 A1    Nov. 1, 2012

(30) Foreign Application Priority Data

Mar. 30, 2011  (DE) .......................... 10 2011 015 522

(51) Int. Cl.
    *B32B 1/06*    (2006.01)
    *B29C 45/20*    (2006.01)

(52) U.S. Cl.
    USPC ........................................ 428/35.7; 425/568

(58) Field of Classification Search
    USPC ............... 428/35.7, 36.9, 568; 425/577, 568; 264/328.1; 76/106; 16/409
    See application file for complete search history.

(56) References Cited

U.S. PATENT DOCUMENTS

| 4,964,217 | A | * | 10/1990 | Siede et al. | ................ | 30/383 |
| 5,948,343 | A | | 9/1999 | Hiroki et al. | | |
| 2011/0254203 | A1 | * | 10/2011 | Eckardt | ................ | 264/328.14 |
| 2012/0068388 | A1 | | 3/2012 | Sakamoto et al. | | |

FOREIGN PATENT DOCUMENTS

DE      102008023473      * 11/2009

OTHER PUBLICATIONS

English machine translation of DE102008023473.*
Search Report of the European Patent Office dated Jul. 5, 2012 in the corresponding European patent application 12001458.4-1253.
English translation of "Moeglichkeiten und Grenzen der Projektilinjektionstechnik", IKV Fachtagung "Gas- Und Wasserinjektionstechnik Potenziale nutzen, Herausforderungen meistern", Nov. 28/29, 2007, pp. 1 to 7, XP007905530, Aachen, Germany.

* cited by examiner

*Primary Examiner* — Ellen S Raudenbush
*Assistant Examiner* — Yan Lan
(74) *Attorney, Agent, or Firm* — Walter Ottesen P.A.

(57) ABSTRACT

A plastic body is configured as a tubular-shaped hollow body in a mid region thereof. The tubular-shaped hollow body is closed off by respective solid bodies at first and second ends. A displacement body, which is arranged at the transition from the hollow body to the first solid body, is arranged at the first end of the tubular-shaped hollow body. A hollow space, which extends between the tubular-shaped hollow body and the second solid body, is formed at the second end of the hollow body. For a production system for making an at least partially tubular-shaped plastic body in an injection molding process, the cavity has an elongated configuration with a first end and a second end and an injector nozzle is arranged between the ends of the cavity.

23 Claims, 5 Drawing Sheets

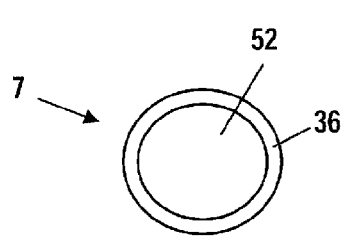
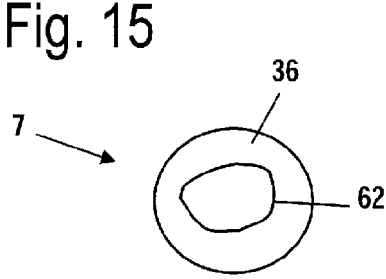
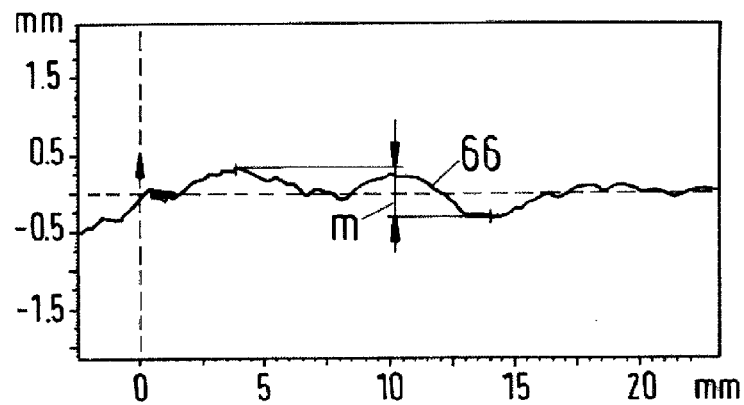
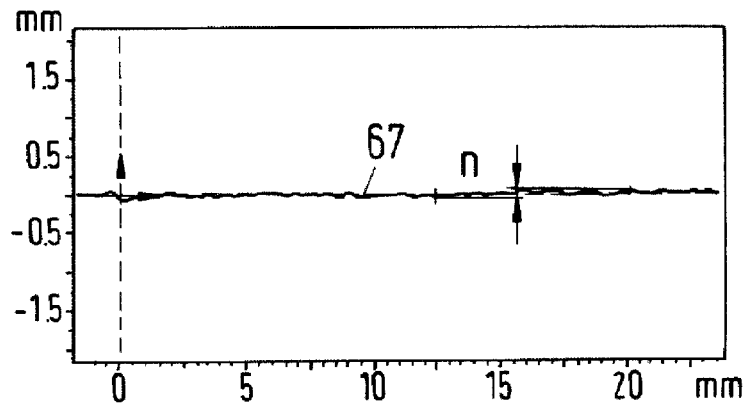

PLASTIC BODY AND A PRODUCTION SYSTEM FOR MAKING A PLASTIC BODY

CROSS REFERENCE TO RELATED APPLICATION

This application claims priority of German patent application no. 10 2011 015 522.8, filed Mar. 30, 2011, the entire content of which is incorporated herein by reference.

FIELD OF THE INVENTION

The invention relates to a plastic body and a production system for a plastic body.

BACKGROUND OF THE INVENTION

U.S. Pat. No. 5,948,343 discloses a hollow body and a method for manufacturing the hollow body, in which a sphere is pushed through the injection mold as a displacement body. The sphere is held in the injection mold during the filling of the melt into the injection mold and exits at the opposite end of the plastic body into a secondary cavity together with the displaced melt. As a result, the plastic body has large openings, the diameter of which corresponds to the inner diameter of the plastic body, at its ends.

It is also known to leave the displacement body in the plastic body so that a large outlet opening can be avoided.

SUMMARY OF THE INVENTION

It is an object of the invention to provide a plastic body which is lightweight, has high stability and high dimensional accuracy. It is a further object of the invention to provide a production system for making a plastic body which is of light weight, has high stability and high dimensional accuracy.

The plastic body of the invention includes: a mid region configured as a tubular-shaped hollow body and having first and second ends; first and second closed solid bodies closing off the mid region at the first and second ends, respectively; the tubular-shaped hollow body and the first closed solid body conjointly defining a transition; a displacement body disposed at the first end of the tubular-shaped hollow body at the transition; a hollow space formed at the second end of the tubular-shaped hollow body; and, the hollow space extending between the tubular-shaped hollow body and the second closed hollow body.

Because the plastic body is configured as a tubular hollow body in its middle region, high stability results with low weight. Because the displacement body is arranged at one end of the tubular hollow body at the transition to the first solid body, that is, the displacement body remains in the plastic body, a large outlet opening for the displacement body can be avoided, so that a largely closed outer surface of the plastic body can be produced and an opening for the injector nozzle is the only opening which need remain. The tubular hollow body is in this case advantageously manufactured in a projectile injection method in which the displacement body is pushed through the middle region, specifically by a fluid. The hollow space formed at the second end of the tubular hollow body is in contrast not produced by the displacement body but only by the fluid. As a result, a collapsing of the plastic at the second end of the tubular hollow body can be avoided. The hollow space is created by maintaining fluid pressure for an appropriately long time during production. The hollow space is accordingly not produced in a projectile internal pressure method but rather in a fluid internal pressure method. On account of the combination of the two differently manufactured sections of the plastic body, a low weight of the plastic body can be produced. At the same time, the middle region can be arranged in such a manner that no deflections or direction changes which are too sharp for the displacement body result during manufacture. The position in which the injector nozzle projects into the plastic body can be selected such that the opening is not disruptive, for example by being positioned in such a manner that it is covered by other components or can be used as a fastening opening.

The tubular hollow body advantageously has very little roughness on its inner walls. The maximum profile height, that is to say the distance between the line of the profile tips and the profile valleys is advantageously less than 0.1 mm. The wall thickness is very small. In the region of the hollow body, the maximum profile height is several times greater and in particular is more than 0.3 mm, especially more than 0.5 mm. The wall thickness in this region is several times, advantageously approximately 2.5 up to approximately 5 times, the wall thickness of the tubular hollow body.

It is provided that the displacement body has an opening for a plug-on section of an injector nozzle. As a result, the displacement body can be placed on the injector nozzle during manufacture prior to the introduction of the melt. As a result, the opening into the interior of the plastic body, which opening is created during manufacture, can be kept small. The tubular hollow body is, in particular, closed at one end and closed at the other end with the exception of the opening formed by the injector nozzle. The opening in the displacement body is, in particular, conical so that the displacement body can be plugged firmly onto the injector nozzle.

The configuration of the displacement body is influenced by the scattering of the wall thickness of the plastic body. In order to achieve a scattering of the wall thickness which is as minimal as possible and thus to enable a small wall thickness, the displacement body has a cylindrical section and a tapered section, wherein the tapered section projects into the solid body. The cylindrical section in this case forms, in particular, the sections in which the plastic body runs straight, while the tapered section forms the curves of the plastic body. Advantageously, the tapered section is configured as a paraboloid or as a body of rotation of a segment of a circle. The ratio of the height of the displacement body to the diameter in the cylindrical section is advantageously between approximately 0.6 and approximately 2. A ratio of height to diameter of approximately 1.25 has been found to be particularly advantageous. The cylindrical section is advantageous configured in a narrow manner. The height of the cylindrical section in relation to the diameter in the cylindrical section is advantageously approximately 0.1 to approximately 0.3. The diameter of the cylindrical section corresponds in this case to the largest diameter of the tapered section.

In order to achieve a low weight of the displacement body with high stiffness, it is advantageously provided that the displacement body has at least one stiffening rib on the side which delimits the hollow body. It is provided that the plastic body has an injector opening. The ratio of the diameter of the injector opening to the diameter of the displacement body is advantageously less than approximately 0.7, in particular less than approximately 0.5, advantageously less than approximately 0.3. As a result, there is little negative impact on the ergonomics and the appearance of the plastic body on account of the injector opening at a low weight of the plastic body.

The displacement body, which remains in the plastic body, is advantageously used to form a gradual stiffness transition from the hollow body to the first solid body. This stiffness transition can be set by way of the configuration and the material of the displacement body. Advantageously, the firmness of the plastic body in the region of the displacement body is less than in the region of the first solid body and greater than the firmness of the hollow body. As a result, large stiffness jumps at the transition from the hollow body to the solid body are avoided. In order to achieve a low weight, it is provided that the total length of the solid body is less than 50% of the length of the tubular hollow body. The plastic body is, in particular, a bale handle for a portable, handheld work apparatus.

The production system of the invention is for making an at least partially tubular-shaped plastic body in an injection molding process. The production system includes: an injection mold delimiting a cavity; a gate for passing plastic melt into the cavity; an injector nozzle for introducing a fluid into the cavity; a displacement body disposed in the cavity; the injector nozzle having a plug-on section for the displacement body; the cavity having an elongated form and having first and second ends; and, the injector nozzle being arranged between the first and second ends of the cavity.

For the production system, it is provided that the injector nozzle has a plug-on section for a displacement body. As a result, the displacement body can be arranged in the cavity so that no penetration of the displacement body through the outer wall of the plastic body is necessary during the injection molding process. The required opening in the plastic body is delimited only by the outer diameter of the injector nozzle, which can be selected to be substantially smaller than the outer diameter of the displacement body. The small opening enables the production of the plastic body with gas injection with little limitation of the design. If the plastic body is a bale handle, the small opening enables the production with gas injection without the ergonomics of the bale handle being restricted in this region. The cavity has in this case an elongate configuration with a first end and a second end. The elongate configuration characterizes in this case a configuration having a first and a second end, between which the cavity extends. The cavity can in this case be curved and have different cross-sections. The injector nozzle is arranged in this case between the ends of the cavity. As a result, variable positioning of the injector nozzle is possible. At the same time, a tubular hollow body can be produced by the injector nozzle in the direction of one end in a projectile internal pressure process and a hollow space can be produced by the injector nozzle in the direction of the other end in a fluid internal pressure process. As a result, a falling in of the plastic body in its end regions is avoided and a low weight with high stability is achieved.

Advantageously, the ratio of the largest diameter of the plug-on section to the diameter of the displacement body is less than approximately 0.7, in particular less than approximately 0.5, advantageously less than 0.3. The opening, which forms the plug-on section in the plastic body, is thus substantially smaller than the free cross-section in the tubular hollow body of the plastic body.

In order to ensure secure fastening of the displacement body on the injector nozzle, it is provided that the plug-on section is configured in a conical manner. Thus, manufacturing tolerances of the displacement body can be compensated. The plug-on section is advantageously configured to be long and thin. At the same time, the plug-on section is in this case advantageously the section of the injector nozzle which projects through the wall of the plastic body into the interior hollow space.

The largest diameter of the injector nozzle is advantageously also configured to be comparatively small. The ratio of the outer diameter of the plastic body in its tubular region to the largest diameter of the injector nozzle is advantageously greater than approximately 1.3, in particular greater than approximately 2, advantageously greater than approximately 3. As a result, the recess which the injector nozzle leaves in the outer wall of the plastic body is comparatively small.

In order to avoid the displacement body being able to emerge from the cavity through the gate, the diameter of the gate is less than the diameter of the displacement body. Advantageously, the production system has a secondary cavity which can be separated from the cavity via a blocking element. Excess melt can be pushed out into the secondary cavity by the displacement body. Advantageously, the displacement body remains in the cavity and in the plastic body. In order to avoid the displacement body emerging into the secondary cavity, the connecting opening between the cavity and secondary cavity has a diameter which is less than the diameter of the displacement body. Advantageously, the melt and the fluid are filled into the cavity from opposite sides of the cavity. As a result, a shifting of the displacement body is avoided. The displacement body is pushed onto the injector nozzle by the melt.

BRIEF DESCRIPTION OF THE DRAWINGS

The invention will now be described with reference to the drawings wherein:

FIG. 14 is a schematic section view through the bale handle in the region of the tubular hollow body;

FIG. 15 is a schematic section view through the bale handle in the region of the hollow space;

FIG. 16 is a diagram which shows the profile height of the inner wall in the region of the hollow space; and, FIG. 17 is a diagram which shows the profile height of the inner wall in the region of the tubular hollow body.

DESCRIPTION OF THE PREFERRED
EMBODIMENTS OF THE INVENTION

Figure 1:
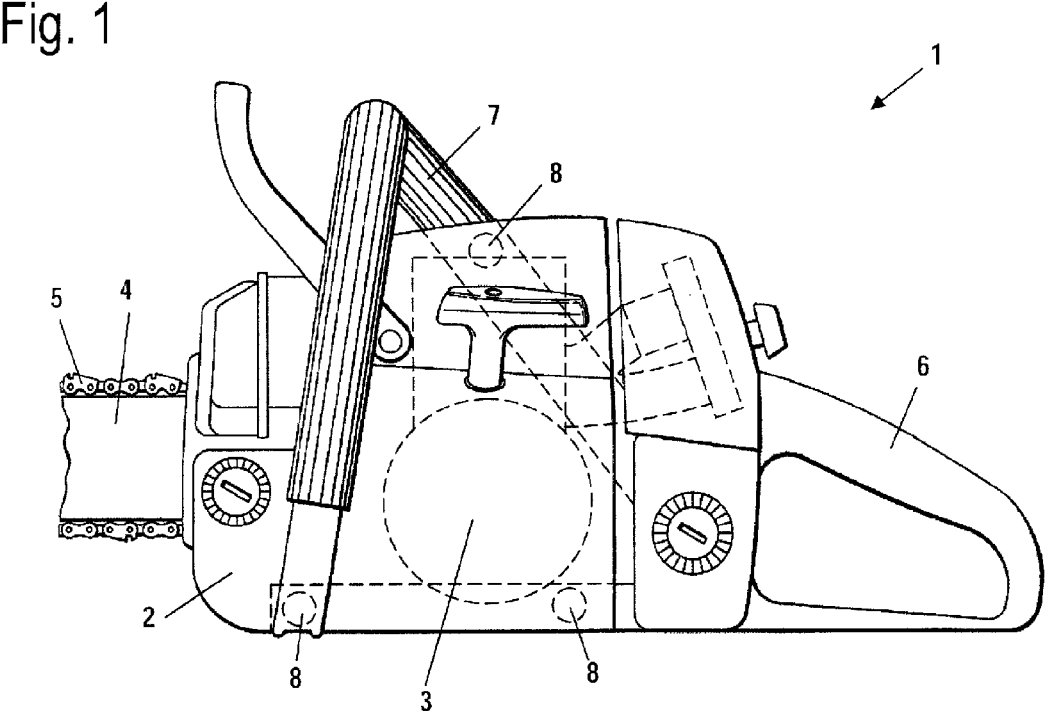
FIG. 1 is a schematic side elevation view of a chain saw.

FIG. 1 shows a chain saw 1 as an embodiment for a handheld work apparatus. The chain saw 1 has a housing 2 in which a drive motor 3 is arranged. The drive motor 3 is advantageously configured as a combustion engine. The chain saw 1 has a guide bar 4 on which a saw chain 5, which is driven by the drive motor 3, is arranged. A rear handle 6 and a bale handle 7 are fixed on the housing 2 via anti-vibration elements 8. The bale handle 7 is configured as a bow-type handle. Corresponding bow-type handles are also used in other handheld work apparatus, for example in cut-off machines or the like.

Figure 2:
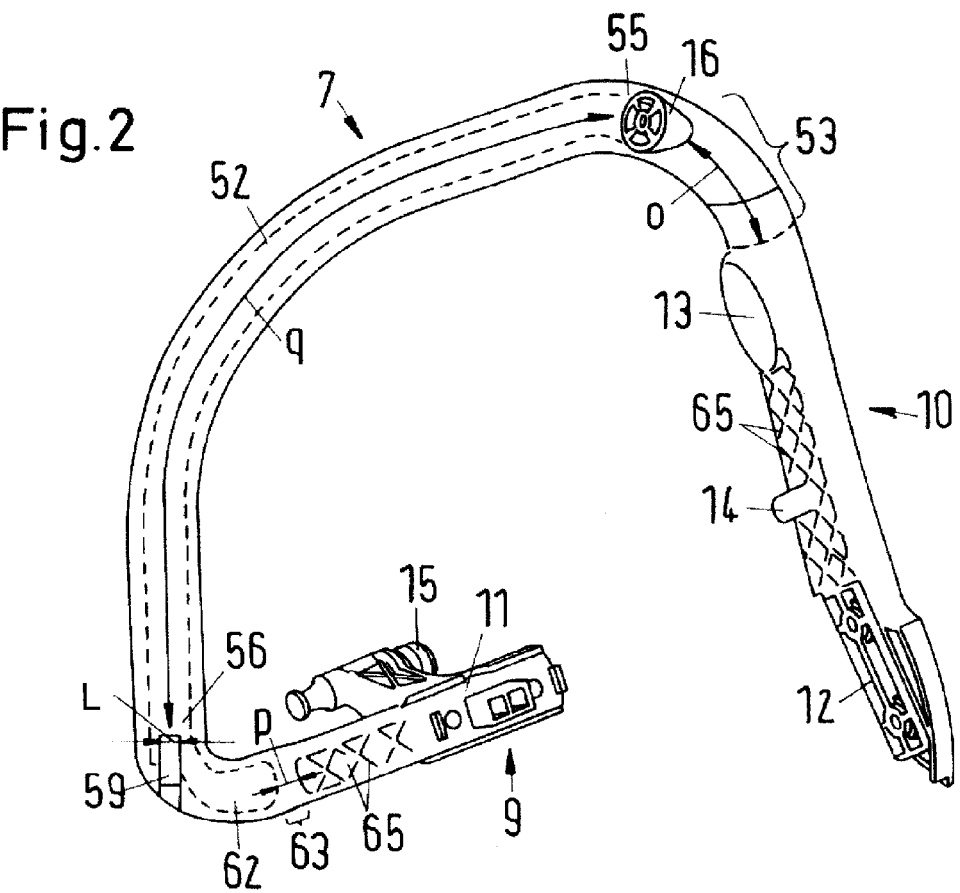
FIG. 2 is a schematic view of a bale handle of the chain saw.

FIG. 2 shows the structure of the bale handle 7 in detail. The bale handle 7 has a first end region 9 on which a first fastening section 11 is formed. The fastening section 11 serves to fix the bale handle 7 on a handle frame. A threaded stud 15 is provided for fixing an anti-vibration element 8. The bale handle 7 has a second end region 10 having a second fastening section 12. A stop stud 14 for a damper and a receptacle 13 for an anti-vibration element are further arranged in the region of the second end 10. The bale handle 7 has a middle region which is configured as a tubular hollow body 52. The tubular hollow body 52 has a first end 55 adjacent to the second end region 10 and a second end 56 which is arranged adjacent to the first end region 9. The tubular hollow body 52 is closed by a first solid body 53 at the first end 55. The first solid body 53 has a length o in the longitudinal direction of the bale handle 7. The tubular hollow body 52 has a length q measured in the longitudinal direction. The receptacle 13 and the stop stud 14 adjoin to the first solid body 53. In this region, the bale handle 7 has a plurality of ribs 65, which serve as stiffening. At the transition from the hollow body 52 to the solid body 53, a displacement body 16 is arranged in the interior of the bale handle 7 at the first end 55 of the hollow body 52 and is held firmly in the outer material of the bale handle 7. The displacement body 16 is schematically indicated in FIG. 2 and cannot be seen from the outside. The bale handle 7 has an injector opening 59 adjacent to the second end 56 of the hollow body 52, said injector opening 59 connecting the interior of the hollow body 52 to the surroundings. The injector opening 59 has a smallest diameter L. The ratio of the diameter L of the injector opening 59 to the diameter d of the displacement body 16 (FIG. 5) is advantageously less than 0.7, in particular less than 0.5.

A hollow space 62 adjoins the second end 56 of the tubular hollow body 52. The inner wall of the bale handle 7 is very rough in the region of the hollow space 62, as is described in more detail below. The hollow space 62 and thus also the hollow body 52 are closed by a second solid body 63 at this end. The second solid body 63 has a length p measured in the longitudinal direction of the bale handle 7. This is adjoined by fastening section 11, which also has ribs 65 for stiffening.

In order to achieve a low weight for the bale handle 7, it is provided that the total length of the lengths o and p of the solid bodies 53 and 63 are less than 50% of the length q of the tubular hollow body 52. Advantageously, the sum of the lengths o and p is less than 30% of the length q. The solid bodies 53 and 63 can be configured in a very short manner and can serve only to close the hollow body 52 and hollow space 62.

Figure 3:
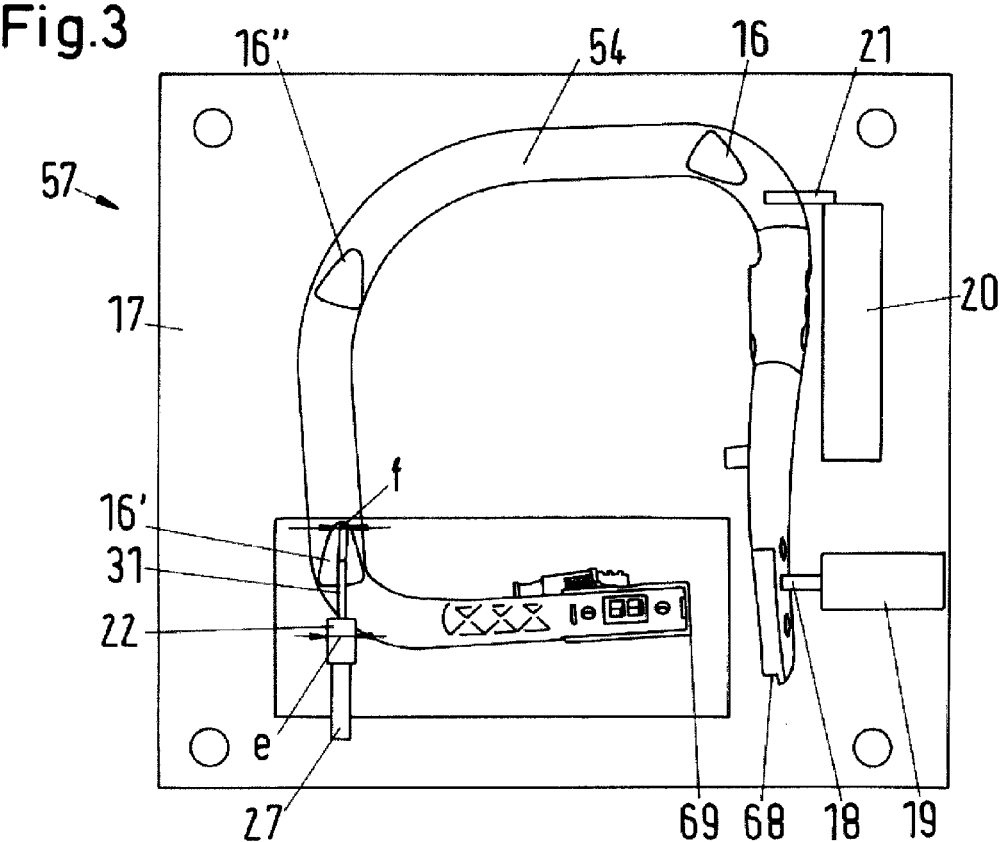
FIG. 3 is a schematic view of a production system for manufacturing the bale handle.

FIG. 3 schematically shows a production system 57 for manufacturing the bale handle 7. The production system 57 has an injection mold 17 in which a cavity 54 and a secondary cavity 20 are formed. The injection mold 17 has a blocking element 21 with which the secondary cavity 20 can be connected to the cavity 54 or separated therefrom. The cavity 54 has a first end 68, adjacent to which the second end region 10 of the bale handle 7 is molded, as well as a second end 69 adjacent to which the first end region 9 of the bale handle 7 is molded. A melt conveyor 19 which opens into the cavity 54 by way of a gate 18 is provided for the supply of plastic melt. The gate 18 is arranged adjacent to the first end 68. The secondary cavity 20 is also connected to the cavity 54 adjacent to the first end 68 thereof. In the configuration shown in FIG. 3, the blocking element 21 is arranged between the gate 18 and the second end 69 of the cavity 54 in the longitudinal direction of the bale handle 7.

An injector nozzle 22 having a conical plug-on section 31 projects into the cavity 54 at a distance from the second end 69. The plug-on section 31 has a largest diameter f (see also FIG. 4). A displacement body can be plugged onto the plug-on section 31 and is referenced as 16' in that position. The injector nozzle 22 is connected to a fluid connection 27 via which a fluid, that is to say a gas or a liquid, advantageously a gas, in particular nitrogen, can be supplied into the cavity 54. A middle position of the displacement body is referenced by 16'' and the end position of the displacement body 16 in the bale handle 7 is referenced by 16.

Figure 4:
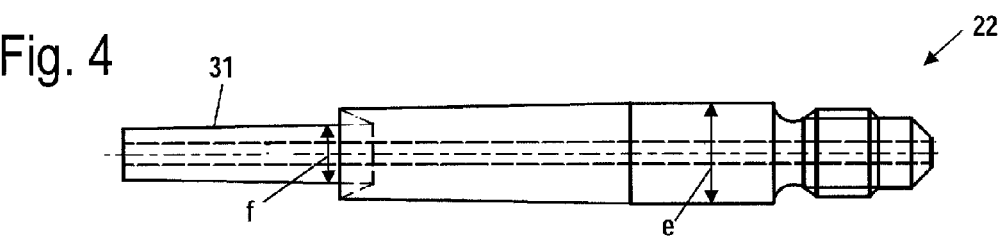
FIG. 4 is a side elevation view of the injector nozzle.

The injector nozzle 22 has a largest diameter e, as also shown in FIG. 4. The largest diameter e of the injector nozzle 22 is substantially less than the diameter a of the bale handle 7 shown in FIG. 5. The ratio of the diameter a of the bale handle 7 to the diameter e of the injector nozzle is advantageously greater than approximately 1.3, in particular greater than approximately 2, especially greater than approximately 3. The largest outer diameter of the injector nozzle 22 is advantageously configured to be as small as possible in order to keep the recess, which is formed by the injector nozzle, on the outer side of the bale handle 7 as small as possible. The outer diameter f of the plug-on section 31 is also advantageously selected to be as small as possible. The diameter f is advantageously less than 10 mm. The ratio of the diameter f to the diameter d of the displacement body 16 is advantageously less than approximately 0.7, in particular less than approximately 0.5.

Figure 5:
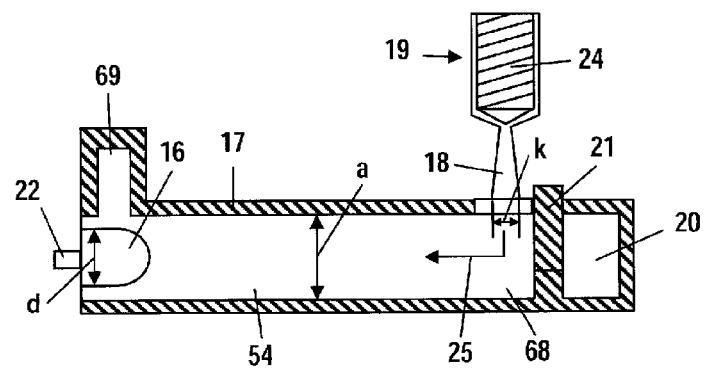
FIGS. 5 to 7 are schematic section views which illustrate the production process.
Figure 6:
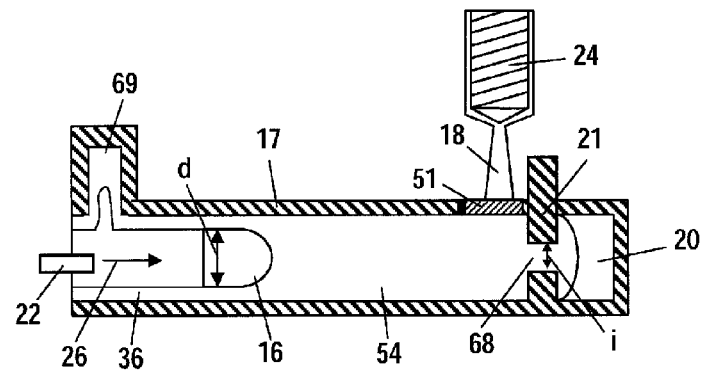
Figure 7:
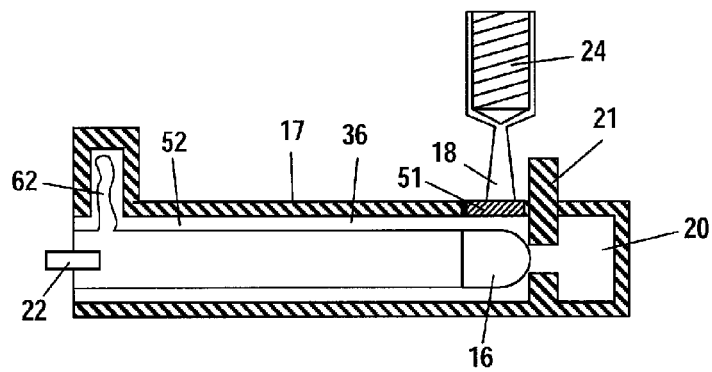

FIGS. 5 to 7 illustrate the procedure during the manufacture of the bale handle 7. Initially, as shown by arrow 25 in FIG. 5, melt is supplied from the first end 68 of the cavity to the second end 69 thereof via the gate 18. The displacement body 16 is plugged onto the plug-on section 31 of the injector nozzle 22 prior to the filling of the melt and in particular prior to the closing of the injection mold 17 and is already firmly held on the injector nozzle 22 in the cavity 54 when the melt supply begins. The melt conveyor 19 includes a screw 24 for conveying the melt. The gate 18 has a diameter k which is less than the diameter d of the displacement body 16. The diameter d is less than the diameter a of the bale handle 7. During the filling of the melt into the cavity 54, the blocking element 21 is closed, as shown in FIG. 5, and the secondary cavity 20 is not connected to the cavity 54.

After the entire cavity 54 has been filled with melt, the gate 18 is closed by a slide 51 (FIG. 6). At the same time, the blocking element 21 opens and connects the cavity 54 to the secondary cavity 20. As FIG. 6 shows, the blocking element 21 opens a connection opening 68, the diameter i of which is likewise less than the diameter d of the displacement body 16. After the slide 51 has been closed and the blocking element 21 has been opened, the fluid is supplied via the injector nozzle 22. The fluid pushes the displacement body 16 in front of itself through the cavity 54. This is illustrated by the arrow 26. Since the diameter d of the displacement body 16 is less than the inner diameter a of the cavity 54, which corresponds to the outer diameter of the bale handle 7, a wall 36, which forms the wall of the bale handle 7 after demolding, remains at the wall of the cavity 54. The melt from the cavity 54 is pushed into the secondary cavity 20 by the displacement body 16. As FIG. 7 shows, the displacement body 16 is pushed into the region of the blocking element 21. Here, the displacement body 16 remains in the bale handle 7. As FIGS. 6 and 7 show, the fluid does not flow only in the direction of the first end 68 but also starting from the injector nozzle 22 in the direction of the second end 69. Because no displacement body is pushed in the direction of the second end 69, an irregular wall thickness and wall structure is achieved here. The fluid flowing in this region forms the hollow space 62, as shown in FIG. 7.

Figure 8:
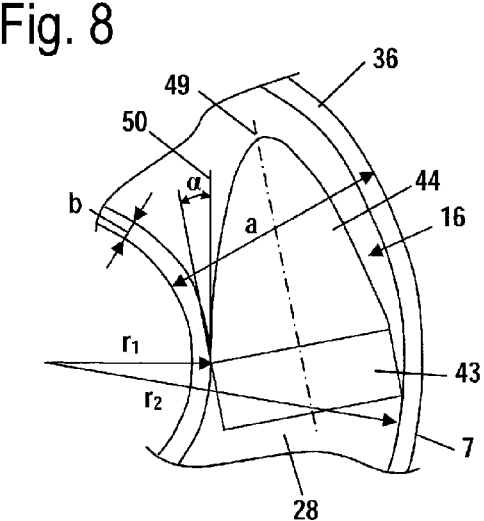
FIG. 8 is a schematic view of the displacement body as it is passing through the bale handle.

As FIG. 8 shows, the displacement body 16 has a cylindrical section 43 and a tapered section 44 which adjoins the latter. The displacement body 16 is shown in a curve of the bale handle 7. The displacement body 16 is arranged in the interior of the tubular hollow body 52. The wall 36 of the bale handle 7 has a wall thickness b. The inner surface of the wall 36 runs with an inner radius $r_1$ on its inner side and an outer radius $r_2$ on its outer side. The cylindrical section 43 touches the wall 36 circumferentially and thus forms the interior space of the tubular hollow body 52. The displacement body 16 has a longitudinal center axis 49 which is inclined at an angle α relative to a tangent 50 on the inner wall of the hollow body 52.

Figure 9:
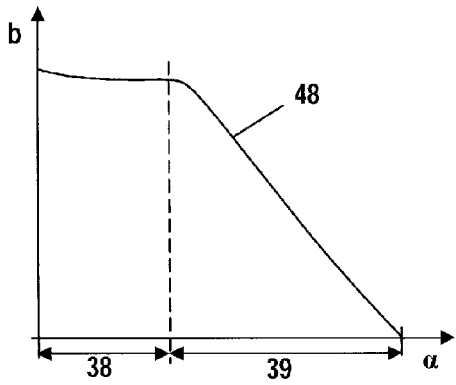
FIG. 9 is a diagram which shows the wall thickness in dependence on the deflection angle of the displacement body.

FIG. 9 shows the correlation between the wall thickness b and the angle α by way of a curve 48. In a first angle range 38, the wall thickness is largely constant. In this angle range, the cylindrical section 43 forms the inner contour. At larger rotational angles α, that is, in the second angle range 39, the tapered section 44 comes into engagement with the inner contour and shapes the inner contour. Because of the larger tilt of the displacement body 16, the wall thickness b decreases with increasing rotational angle α.

Figure 10:
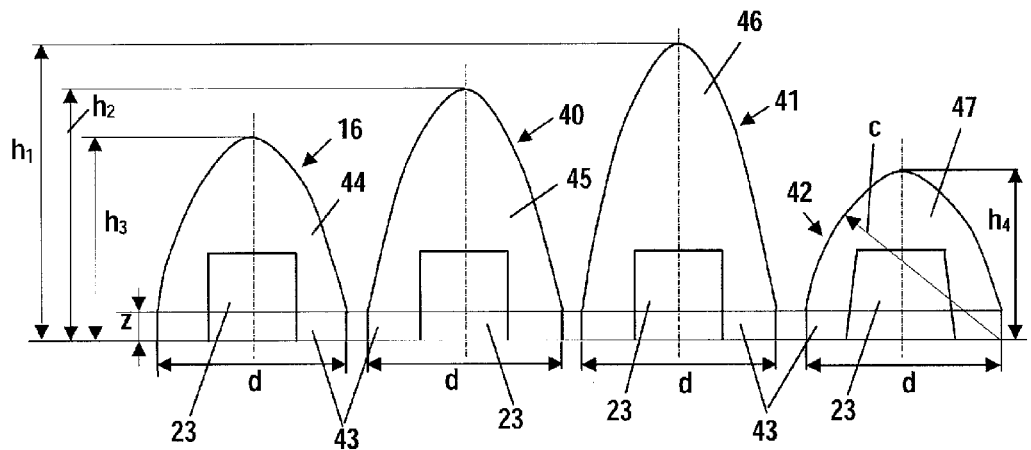
FIG. 10 is a schematic view of embodiments of the displacement body.

FIG. 10 shows different embodiments for the displacement body 16, 40, 41 and 42. All displacement bodies 16, 40, 41 and 42 have a cylindrical section 43, which has a height z, as well as a largest diameter d and an opening 23 which opens toward the cylindrical section 43 and is configured in a conical manner. This is shown in an exaggerated manner for the displacement body for the purposes of illustration. The displacement body 16, 40, 41 and 42 is plugged onto the injector nozzle 22 by way of the opening 23. Different tapered sections 44, 45, 46 and 47 adjoin the cylindrical section 43. The sections 44, 45 and 46 are each configured as paraboloids, that is to say as rotational bodies which result from the rotation of a parabolic curve. The displacement body 16 has a height $h_3$, which corresponds approximately to the diameter d. With this configuration, very beneficial residual wall thicknesses result. The displacement body 40 has a height $h_2$, which is 1.25 times the diameter d. The displacement body 41 has a height $h_1$, which corresponds to 1.5 times the diameter d. With an increasing ratio of height h to diameter d, the minimum radius which can be formed decreases. The tapered section 47 is formed by the rotation of a circle segment having the radius c. The height $h_4$ of the displacement body 42 is 0.8 to 0.9 times the diameter d.

The ratio of the height of the displacement body 16, 40, 41 and 42 to the diameter d of the cylindrical section 43 is advantageously approximately 0.6 to approximately 2. The ratio of the height z of the cylindrical section to the diameter d in the cylindrical section is advantageously approximately 0.1 to approximately 0.3.

As a result of the profile configurations of a displacement body 16, 40, 41, 42 shown in FIG. 10, the stiffness of the bale handle 7 at the transition from the hollow body 52 to the solid body 53 can be adapted. The stiffness of the bale handle 7 in the region of the displacement body 16, 40, 41, 42 is advantageously between the stiffness of the hollow body and the stiffness of the solid body. As a result, an abrupt stiffness transition of the bale handle 7 can be avoided and the stability is increased. An abrupt stiffness transition could also lead to a worsening of the dynamic acceleration characteristic values. This is avoided by the suggested configuration.

Figure 11:
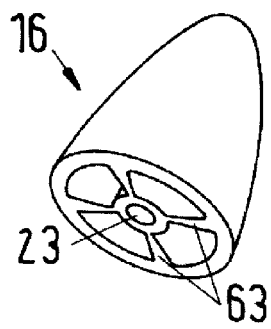
FIG. 11 is a perspective view of the displacement body of FIG. 2.
Figure 12:
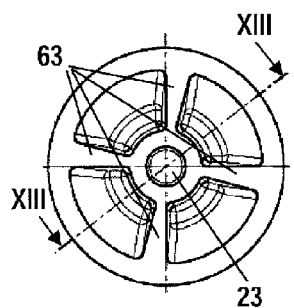
FIG. 12 is a side elevation view of the displacement body of FIG. 11.
Figure 13:
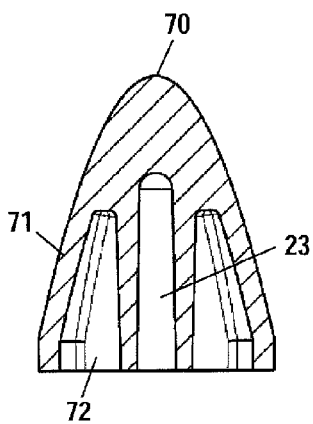
FIG. 13 is section view along the line XIII-XIII in FIG. 12.

FIGS. 11 to 13 show the displacement body 16 in detail. Starting from its flat bottom, the displacement body 16 has in the middle the opening 23 which, as shown in FIG. 13, is configured in a slightly conical manner and tapers in the direction of the flattened tip 70 of the displacement body 16. The displacement body 16 further has an outer casing 71 which is connected to the area surrounding the opening 23 via stiffening ribs 63. Four recesses 72, which are separated from each other by the stiffening ribs 63, are arranged radially between the opening 23 and the outer casing 71. On account of the stiffening ribs 63, a low weight and high stability result for the displacement body 16. The displacement body 16 can be produced effectively in an injection molding process because of the recesses 72, since a collecting of material is thus avoided. As a result, a smooth outer contour of the outer casing 71 can be ensured.

FIGS. 14 and 15 show cross-sections through the bale handle 7. FIG. 14 shows a cross-section in the region of the tubular hollow body 52. As FIG. 14 shows, the thickness of the wall 36 is comparatively constant. In this region, the bale handle 7 is produced with the displacement body 16.

FIG. 15 shows a section through the bale handle 7 in the region of the hollow space 62. In this region, the bale handle 7 is formed without a displacement body merely by introducing a fluid into the interior of the cavity, that is to say it is formed by a fluid internal pressure method. The resulting inner contour 37 is very rough and uneven and so a very high range of fluctuation in the wall thickness results.

FIG. 16 shows the fluctuations of the wall thickness as line 66. The profile height m, that is to say the distance between the highest profile peak and the lowest profile valley, is more than 0.5 mm. In the example embodiment, the profile height m is more than 0.6 mm.

FIG. 17 shows the profile of the tubular hollow body 52 as line 67. The profile height n here is very small and is less than 0.1 mm. As a result of the very smooth inner wall in the region of the tubular hollow body 52, the wall thickness can be configured to be very small. In the region of the hollow space 62, the wall thickness must be chosen to be larger in order to reliably avoid impermissibly small wall thicknesses. The wall thickness in the region of the hollow space 62 in the example embodiment is approximately 5 mm to approximately 6.5 mm. The wall thickness of the bale handle 7 in the region of the tubular hollow body 52 is less than 2 mm.

It is understood that the foregoing description is that of the preferred embodiments of the invention and that various changes and modifications may be made thereto without departing from the spirit and scope of the invention as defined in the appended claims.

What is claimed is:

1. A plastic body comprising:
   a mid region configured as a tubular-shaped hollow body and having first and second ends;
   first and second closed solid bodies closing off said mid region at said first and second ends, respectively;
   said tubular-shaped hollow body and said first closed solid body conjointly defining a transition;
   a displacement body disposed at said first end of said tubular-shaped hollow body at said transition;
   a hollow space formed at said second end of said tubular-shaped hollow body; and,
   said hollow space extending between said tubular-shaped hollow body and said second closed solid body; and,
   said displacement body having an opening for a plug-on section of an injector nozzle.

2. The plastic body of claim 1, wherein said displacement body includes a cylindrical section and a tapered section; and, said displacement body is disposed so as to cause said tapered section to project into said first closed solid body.

3. The plastic body of claim 2, wherein said tapered section of said displacement body is configured as a paraboloid.

4. The plastic body of claim 2, wherein said tapered section of said displacement body is configured as a body of revolution defined by a segment of a circle.

5. The plastic body of claim 2, wherein said displacement body has a height (h) and said cylindrical section has a diameter (d); and, said height (h) and said diameter (d) conjointly define a ratio (h/d) lying in a range of approximately 0.6 to approximately 2.

6. The plastic body of claim 2, wherein said cylindrical section has a height (z) and a diameter (d); and, said height (z) and said diameter (d) define a ratio (z/d) lying in a range of approximately 0.1 to approximately 0.3.

7. The plastic body of claim 2, wherein said plastic body defines a handle and has a wall thickness (b) which, starting at a pregiven bend angle of said handle, is that much smaller depending how small said pregiven bend angle is.

8. The plastic body of claim 1, wherein said displacement body has an end delimiting said tubular-shaped hollow body; and, said displacement body has at least one reinforcement rib at said end.

9. The plastic body of claim 8, wherein said displacement body has a region surrounding and defining said opening thereof; said displacement body further has an outer casing defining an outer surface of said displacement body; and, a plurality of ribs connect said outer casing to said region defining said opening of said displacement body.

10. The plastic body of claim 9, further comprising a plurality of recesses disposed between said outer casing and said region separated one from the other by said plurality of ribs.

11. The plastic body of claim 1, wherein said plastic body further comprises an injector opening disposed approximately between said tubular-shaped hollow body and said hollow space.

12. The plastic body of claim 1, wherein said plastic body has a strength in the region of said displacement body which is less than the strength of said first solid body and greater than the strength of said tubular-shaped hollow body.

13. The plastic body of claim 12, wherein said displacement body has a cylindrical section and a tapered section extending from said cylindrical section; and, said opening of said displacement body extends through said cylindrical section and into said tapered section.

14. The plastic body of claim 12, wherein said displacement body has an outer casing defining an outer surface and a region surrounding said opening of said displacement body; said displacement body has a cylindrical section and a tapered section extending from said cylindrical section; and, said displacement body has a plurality of recesses formed therein in said outer casing between said outer surface and said region with said recesses extending through said cylindrical section and into said tapered section.

15. The plastic body of claim 1, wherein the total length of said first and second solid bodies is less than 50% of the length (q) of said tubular-shaped hollow body.

16. The plastic body of claim 1, wherein said plastic body is a bale handle for a portable hand-guided work apparatus.

17. A plastic body comprising:
a mid region configured as a tubular-shaped hollow body and having first and second ends;
first and second closed solid bodies closing off said mid region at said first and second ends, respectively;
said tubular-shaped hollow body and said first closed solid body conjointly defining a transition;
a displacement body disposed at said first end of said tubular-shaped hollow body at said transition;
a hollow space formed at said second end of said tubular-shaped hollow body;
said hollow space extending between said tubular-shaped hollow body and said second closed solid body;
said displacement body having an opening for a plug-on section of an injector nozzle;
an injector opening disposed approximately between said tubular-shaped hollow body and said hollow space;
said injector opening being the only connection of said hollow body to the outside;
said injector opening having a diameter (L) and said displacement body having a diameter (d); and,
said diameter (L) and said diameter (d) conjointly defining a ratio (L/d) of less than approximately 0.7.

18. The plastic body of claim 17, wherein said plastic body has a bend formed between said tubular-shaped hollow body and said hollow space; and, said injector opening is arranged in said bend.

19. The plastic body of claim 18, wherein said tubular-shaped hollow body has a section bordering on said injector opening; and, said injector opening is formed in said section so as to extend in the longitudinal direction thereof.

20. The plastic body of claim 17, wherein said displacement body has a lower end and said opening of said displacement body is arranged centered in said lower end.

21. The plastic body of claim 17, wherein said opening of said displacement body is conically configured.

22. The plastic body of claim 17, wherein said displacement body has an outer surface configured to be rotationally symmetrical.

23. The plastic body of claim 22, wherein said displacement body has an outer casing defining said outer surface and an inner region surrounding said opening of said displacement body; said displacement body has a plurality of recesses formed in said outer casing radially between said outer surface and said inner region surrounding said opening of said displacement body; and, said plurality of recesses are distributed uniformly in surrounding relationship to said opening of said displacement body.

\* \* \* \* \*